(12) United States Patent
Yahagi

(10) Patent No.: US 7,742,754 B2
(45) Date of Patent: Jun. 22, 2010

(54) MOBILE COMMUNICATION SYSTEM AND METHOD FOR DETERMINING BASE STATION ANTENNA PROXIMITY STATE

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 651 days.

(21) Appl. No.: 11/742,395

(22) Filed: Apr. 30, 2007

(65) Prior Publication Data

US 2007/0254717 A1    Nov. 1, 2007

(30) Foreign Application Priority Data

May 1, 2006    (JP)    ............................... 2006-127387

(51) Int. Cl.
*H04M 11/04*    (2006.01)
(52) U.S. Cl. .............. 455/404.2; 455/414.2; 455/456.1; 455/457; 342/387; 342/457; 379/59
(58) Field of Classification Search .............. 455/404.2, 455/414.2, 456.1, 457, 437, 67.11, 115.1; 342/387, 457, 462, 464; 379/59, 58
See application file for complete search history.

(56) References Cited

U.S. PATENT DOCUMENTS

| 5,394,158 | A  | * | 2/1995  | Chia ........................... 342/457 |
| 5,585,803 | A  | * | 12/1996 | Miura et al. .................. 342/372 |
| 5,809,424 | A  | * | 9/1998  | Eizenhoefer .............. 455/456.2 |
| 6,040,800 | A  | * | 3/2000  | Raith et al. .................. 342/387 |
| 6,085,095 | A  | * | 7/2000  | Collmann .................... 455/453 |
| 6,140,964 | A  | * | 10/2000 | Sugiura et al. .............. 342/464 |
| 6,259,406 | B1 | * | 7/2001  | Sugiura et al. .............. 342/457 |
| 6,266,534 | B1 | * | 7/2001  | Raith et al. ............. 455/456.3 |
| 6,275,190 | B1 | * | 8/2001  | Sugiura et al. .............. 342/464 |
| 6,304,218 | B1 | * | 10/2001 | Sugiura et al. .............. 342/464 |
| 6,321,083 | B1 | * | 11/2001 | Vaara et al. .................. 455/446 |
| 6,501,955 | B1 | * | 12/2002 | Durrant et al. ........... 455/456.1 |
| 6,542,484 | B1 | * | 4/2003  | Ovesjo et al. ................ 370/335 |
| 6,738,623 | B1 | * | 5/2004  | Oh et al. ..................... 455/450 |
| 6,934,546 | B1 | * | 8/2005  | Corbett et al. .............. 455/441 |

(Continued)

FOREIGN PATENT DOCUMENTS

JP    07-046646 A    2/1995

(Continued)

OTHER PUBLICATIONS

Molish A F et al: "MIMO systems with antenna selection" IEEE Microwave Magazine, IEEEService Center, Piscataway, NJ US, vol. 5, No. 1, Mar. 2004, pp. 46-56, XP011110924.

(Continued)

*Primary Examiner*—Minh D Dao
(74) *Attorney, Agent, or Firm*—Sughrue Mion, PLLC

(57) ABSTRACT

Mobile terminals 201 to 203 measure strength of the received signal from plurality of base station antennas 101 to 105 and transmits it to network system 300. Network system 300 determines proximity state between plurality of base station antennas 101 to 105 based on the strength of the received signal from plurality of base station antennas 101 to 105 transmitted from mobile terminals 201 to 203. From that determination, the base station antennas proximity state matching a position or features of an antenna of the mobile terminal can be recognized.

12 Claims, 13 Drawing Sheets

U.S. PATENT DOCUMENTS

| | | | |
|---|---|---|---|
| 6,950,663 B2 * | 9/2005 | Pihl et al. | 455/456.5 |
| 6,999,778 B2 * | 2/2006 | DiBuduo | 455/456.1 |
| 7,024,232 B2 * | 4/2006 | Ponce De Leon et al. | 455/575.5 |
| 7,151,940 B2 * | 12/2006 | Diao et al. | 455/456.1 |
| 7,366,492 B1 * | 4/2008 | Ganesh | 455/404.2 |
| 7,577,443 B1 * | 8/2009 | Moll et al. | 455/456.1 |
| 2002/0128019 A1 | 9/2002 | Ben-Yair et al. | |
| 2002/0168943 A1 | 11/2002 | Callaway, Jr. et al. | |
| 2003/0162568 A1 * | 8/2003 | Schreiner et al. | 455/562 |
| 2004/0203921 A1 * | 10/2004 | Bromhead et al. | 455/456.1 |
| 2004/0214621 A1 * | 10/2004 | Ponce De Leon et al. | 455/575.8 |
| 2005/0185618 A1 | 8/2005 | Friday et al. | |
| 2005/0227703 A1 * | 10/2005 | Cheng | 455/456.1 |
| 2005/0239510 A1 | 10/2005 | Cho et al. | |
| 2008/0169936 A1 * | 7/2008 | Pickering et al. | 340/657 |
| 2009/0124235 A1 * | 5/2009 | Bosch et al. | 455/411 |
| 2009/0191891 A1 * | 7/2009 | Ma et al. | 455/456.1 |
| 2009/0247169 A1 * | 10/2009 | Kawasaki | 455/440 |

FOREIGN PATENT DOCUMENTS

| | | |
|---|---|---|
| JP | 08-195711 A | 7/1996 |
| JP | 08-251097 A | 9/1996 |
| JP | 2000-333232 A | 11/2000 |
| JP | 2002-084567 A | 3/2002 |

OTHER PUBLICATIONS

Xiaodi Zhang, Norman C. Beaulieu: "Ser of threshold-based hybrid selection/maximal-ratio-combining in correlated Nakagami fading" IEEE Transactions on Communications, vol. 53, No. 9, Sep. 1, 2005, pp. 1423-1426, XP002443826.

* cited by examiner

| | | CLOSE | ADJACENT |
|---|---|---|---|
| 101 | 102 | — | 1 |
| 101 | 103 | — | 1 |
| 101 | 104 | — | — |
| 101 | 105 | — | — |
| 102 | 103 | 1 | — |
| 102 | 104 | — | 2 |
| 102 | 105 | 1 | — |
| 103 | 104 | — | 1 |
| 103 | 105 | — | — |
| 104 | 105 | 1 | 1 |

UC : HIGH LEVEL ANTENNA COUNTER
MC : MEDIUM LEVEL ANTENNA COUNTER
ANU (i) : HIGH LEVEL ACCUMULATION MEMORY
ANM (i) : MEDIUM LEVEL ACCUMLATION MEMORY
AD (i,j) : PAIR OF CLOSE ANTENNAS
ND (i,j) : PAIR OF ADJACENT ANTENNAS

Fig. 17

| i | j | AD(i,j) | ND(i,j) |
|---|---|---------|---------|
| 1 | 2 | −       | 1       |
| 1 | 3 | −       | 1       |
| 1 | 4 | −       | −       |
| 1 | 5 | −       | −       |
| 2 | 3 | 1       | −       |
| 2 | 4 | −       | 1       |
| 2 | 5 | −       | −       |
| 3 | 4 | −       | 1       |
| 3 | 5 | −       | −       |
| 4 | 5 | −       | −       |

AD(i,j) : PAIR OF CLOSE ANTENNAS
ND(i,j) : PAIR OF ADJACENT ANTENNAS

Fig. 18

| i | j | AD(i,j) | ND(i,j) |
|---|---|---------|---------|
| 1 | 2 | −       | 1       |
| 1 | 3 | −       | 1       |
| 1 | 4 | −       | −       |
| 1 | 5 | −       | −       |
| 2 | 3 | 1       | −       |
| 2 | 4 | −       | 2       |
| 2 | 5 | 1       | −       |
| 3 | 4 | −       | 1       |
| 3 | 5 | −       | −       |
| 4 | 5 | 1       | 1       |

AD(i,j) : PAIR OF CLOSE ANTENNAS
ND(i,j) : PAIR OF ADJACENT ANTENNAS

MOBILE COMMUNICATION SYSTEM AND METHOD FOR DETERMINING BASE STATION ANTENNA PROXIMITY STATE

This application is based upon and claims the benefit of priority from Japanese Patent Application No. 2006-127387 filed on May 1, 2006, the content of which is incorporated by reference.

BACKGROUND OF THE INVENTION

1. Field of the Invention

The present invention relates to a mobile communication system and a method for determining a base station antenna proximity state.

2. Description of the Related Art

In the mobile communication system using a wireless medium as a communication medium between a mobile terminal and a base station, improving the receiving efficiency of a signal is effective to increase the communication capacity. Higher receiving efficiency can lower transmission power for meeting the same signal quality, which can reduce interference power caused by transmission power generated from the terminal or the base station. Generally, the received signal quality such as a bit error rate is determined by the ratio of desired signal power to interference power. For improving the quality of the received signal, the desired signal power needs to be increased or the interference power needs to be decreased.

In order to enable as many mobile terminals as possible to perform communication in the case where mobile terminals are present in an area covered by a plurality of wireless base stations, the base station having the highest receiving efficiency and the mobile terminal need to communicate with each other. That means that a mobile terminal communicates with the closest base station in terms of propagation space. The shortest distance in terms of propagation space is the closest geographical distance on flat land. In urban areas having clusters of buildings, however, the buildings or the like reflect or scatter a wireless signal, thus, a distance in terms of propagation space is not necessarily short for even if the geographical distance is close. Therefore, a mobile terminal device estimates and determines a base station to place a communication link by estimating the distance between the mobile terminal and a base station in terms propagation space. In the estimation, power transmitted from a base station received at the mobile terminal is measured and its propagation loss is estimated by an attenuation of the power.

As another method for improving the receiving efficiency, a space diversity technique can be used. The technique includes a receiving diversity for receiving a radio wave transmitted from a single transmission point at a plurality of different positions in terms of propagation space and a transmitting diversity for transmitting a radio wave from a plurality of different positions in terms of propagation space to a single receiving point. In an actual mobile communication system, a receiving gain can be improved as a radio wave transmitted from a single mobile terminal is received at a plurality of base station antennas and the signals received at respective antennas are combined. The improved receiving gain can reduce transmission power for maintaining a predetermined signal quality. Accordingly, the mobile terminal's interference power that affects another mobile terminal decreases so that communication capability from the mobile terminal to the base station antenna can be increased.

The Code Division Multiple Access system includes methods for increasing the receiving efficiency by receiving a signal transmitted from a single transmitting point at a plurality of different receiving points. The first method one is a selection combining for decoding a signal transmitted from a single transmitting point into base band signals at a plurality of receiving points respectively, performing quality evaluation on the signal received at each point, determining whether the signal is valid (without an error) or invalid (with an error), and determining the signal to capture. The second method is a maximum ratio combining for aligning signals received at a plurality of receiving points such that they arrive at the same time and adding the signals, then decoding the signal into the base band signal.

In the selection combining method, any one of the signals received at the plurality of receiving points needs to be valid (without an error). If two or more signals are valid, only one of them is to be referenced. Many invalid signals each having a few errors do not work at all.

The maximum ratio combining method has a feature of adding energies of respective signals received at a plurality of receiving points. Thus, if the signals received at the received points are collected, receiving power that is sufficient for decoding a signal can be obtained, even if the receiving power received at only a single receiving point is insufficient. As a result that makes the receiving efficiency higher than in the case where a signal is received at a single point. Thus, this can reduce the transmission power at a transmission point required for providing a predetermined signal quality.

The selection combining reception and the maximum ratio combining reception methods differ in their required transmission channels. In the selection combining reception method, because the transmitted signal is decoded into the base band signal at the receiving points, the signals only need to be collected at a combining point through transmission channels having a similar information rate as that for the base band signal. Thus, a low speed transmission channel is sufficient for the transmission channel between the receiving point and the combining point. In contrast, in the maximum ratio combining method, the transmitted signal is not decoded into the base band signal at the receiving points and the signals in a wireless section base need to be collected because they are at a combining point through transmission channels. Thus, a high speed transmission channel is required for the transmission channel between the receiving point and the combining point. Therefore, the actual maximum ratio combining is only applied in the case where the receiving point and the combining point are geographically close so that a high speed transmission channel can be ensured between the receiving point and the combining point. In the other cases, the selection combining is adopted. That is to say, the maximum ratio combining is a combining method that is performed between sectors of sector base stations in which a single base station has a plurality of receiving antennas. The selection combining is a combining method that is performed between base stations that are geographically apart from each other.

As mentioned above, whether the selection combining or the maximum ratio combining methods are applied is logically determined by whether the positions of the plurality of receiving points are geographically close or not. In order to improve the receiving efficiency, however, it is desirable to use the maximum ratio combining reception method whether the receiving points are close or not.

In order to use the maximum ratio combining method, a high speed transmission channel for transferring signals from a plurality of receiving points by signals in the wireless section base is necessary. In order to effectively perform maximum ratio combining reception in a mobile communication system in which a plurality of antennas form a service area, the receiving points whose covering areas are close need to be connected by high speed transmission channels in general terms. Strictly speaking, the maximum ratio combining reception can be effectively performed because signals from a plurality of receiving points that can be received with a certain degree of receiving power are collected to a combining point by a high speed transmission channel.

As mentioned above, in order to use the maximum ratio combining reception, signals in wireless section base received at a plurality of receiving points need to be combined. In such a case, maximum ratio combining is generally performed by having a plurality of antennas, that have different directivity, set in the same base station that is used as a receiving point. This is why it is easy to ensure a high speed transmission channel if the antennas are in the same base station. The maximum ratio combining, however, needs to ensure a high speed transmission channel for a long section in which points are geographically apart from each other. Under the circumstance of a low information transmission rate of the wired transmission channel, it has been considered that the maximum ratio combining is not very realistic. The maximum ratio combining has a feature of improving the receiving efficiency because a signal transmitted from a single point can be received at a plurality of antennas and the signals can be added in terms of energy in the case where a radio wave transmitted from a single mobile terminal is received at a plurality of antennas. Therefore, performing the maximum ratio combining not only between receiving points such as antennas that are contained in a single base station but also between geographically different receiving points as mentioned above may provide an effect of further improving the receiving efficiency.

Connecting any receiving points geographically close to each other by a high speed transmission channel, however, causes large amount of consumption of transmission band in a backbone circuit, and thus increases the cost for establishing a high speed transmission channel. In that case, it is not ensured that all the connected high speed transmission channels are used, resulting in wasted high speed transmission channel. Therefore, in terms of an efficient and pragmatic solution, there is a need to find a pair of receiving points, from among receiving points that are geographically close to one another, that will be effective for performing maximum ratio combining. Thus, a method for finding a base station that a mobile terminal placed in a service area can communicate with as a mobile terminal that is not in communication estimates strength of a downlink electric field from each of the base stations around the mobile terminal and selects a base station with a high strength of the received signal is adopted. A method to cause a mobile terminal that is in operation to select a base station with which it can communicate when the mobile terminal moves by notifying the terminal of the ID of a candidate base station, and that causes the terminal to measure the strength of a downlink electric field from base stations and to inform the strength to the base stations and to select an appropriate base station based on the result, is performed in a handover procedure. For information on surrounding base stations used here, it is common to use a method for placing a particular receiving device in a certain base station, causing the receiving device to measure the strength of the downlink electric field from the plurality of base stations and to generate the information on the surrounding base station based on the measured result. The method is disclosed in Japanese Patent Laid-Open No. 2002-84567, for example.

Such a receiving device that measures the strength of a downlink electric field from surrounding base stations, however, is often created by an object transported on a vehicle that is equipped with a storage device featuring large capacity and higher receiving performance, and the range for such a receiving device is limited to a channel on which the vehicle can move. The height of antennas of devices for measuring the strength of an electric field significantly differ from the height of an antenna of a terminal that is actually used by a user. Such a receiving device has a problem in which it is difficult to make measurements that reflect the changing locations of a mobile terminal actually used by a user in a service area, and thus it is difficult to correctly determine the base station antenna with which the mobile terminal communicates.

SUMMARY OF THE INVENTION

The present invention intends to provide a mobile communication system and a method for determining a base station antenna proximity state that can enable the base station antenna proximity state matching an antenna position or an antenna feature of the mobile terminal owned by an actual user to be recognized.

In order to achieve the above mentioned intention, the present invention has:

a mobile terminal;

a plurality of base station antennas that communicate with the mobile terminal; and network controlling means that controls the plurality of base station antennas;

wherein the mobile terminal measures strength of the received signal from the plurality of base station antennas and transmits the strength of the received signal to said network controlling means; and said network controlling means determines a proximity state between the plurality of base station antennas based on the strength of the received signal from the plurality of base station antennas transmitted from the mobile terminal.

The network controlling means classifies the strength of the received signal from the plurality of base station antennas transmitted from the mobile terminal into three levels, a first level, a second level and a third level in descending order of the strength of the received signal by two thresholds, selects two base station antennas among the plurality of base station antennas, and if the strength of the received signal from both of the two base station antennas are in the first level, determines that the two base station antennas are a pair of close base station antennas whose antennas are close in terms of propagation space, and if the strength of the received signal from one of the two base station antennas is in the first level and the strength of the received signal from the other of the two base station antennas is in the second level, determines that the two base station antennas are a pair of adjacent base station antennas whose antennas are apart from each other in terms of propagation space more than the antennas in the pair of close base station antennas.

The mobile terminal measures the strength of the received signal from the plurality of base station antennas when it is not transmitting nor receiving a signal i.e., while the user is not communicating with the base station.

The mobile terminal measures the strength of the received signal from the plurality of base station antennas when it is transmitting and receiving signals, i.e., while the user is communicating with the base station.

The mobile terminal autonomously measures the strength of the received signal from the plurality of base station antennas.

The mobile terminal measures the strength of the received signal from the plurality of base station antennas based on an instruction from the network controlling means.

The present invention with the abovementioned configuration can recognize a pair of the receiving points for which the maximum ratio combining reception is effective to improve the signal receiving efficiency in a mobile communication system covered by a plurality of base station antennas. The present invention causes the mobile terminal in the service area to measure the strength of the received signal from a plurality of base stations antennas that are close to each other, evaluate the distance between the mobile terminal and the base station antennas in terms of an electrical wave propagation, based on the measurements, and to statistically calculate the pair of antennas that will be effective in receiving a signal from the mobile terminal by using the maximum ratio combining. Since the strength of the downlink signal received from the plurality of base station antennas that is measured by the mobile terminal is determined by the transmission power at the base station and by an attenuation in the propagation section, an equivalent distance in terms of electrical wave propagation between the base station antenna and the mobile terminal is measured by the strength of the received downlink signal.

The strength of the received signal from the plurality of base station antennas measured by the mobile terminal is estimated for each of the plurality of base station antennas. The strength of the received signal from the plurality of base station antennas is classified into three levels of the first, the second and the third levels by two thresholds. Then, two base station antennas are selected from the plurality of base station antennas, and if the strength of the received signal from both of the two base station antennas is in the first level, which represents received signals that have the highest strength, the two base station antennas are judged to be a pair in close proximity to each other and, in terms of propagation space, the distance between the base station antennas is close. If the strength of the received signal of one of the two base station antennas is in the first level and that of the other is in the second level, which represents received signals that have the second highest strength, the two base station antennas are judged to be a pair of base station antennas that are adjacent to each other, and in terms of propagation space, the distance is longer than the distance between the pair of base station antennas that are close to each other. Then, the pairs are written in a statistic information accumulation table. Then, the statistic data is disclosed and the pair of the base station antennas is estimated. This estimate is based on the large amount of notified information that has been transmitted from the mobile terminal and from the information that statistically shows the distribution of users having mobile terminals.

The above and other objects, features, and advantages of the present invention will become apparent from the following description with reference to the accompanying drawings, which illustrate examples of the present invention.

BRIEF DESCRIPTION OF THE DRAWINGS

FIG. 17 is a table showing set values of the pair of close base station antennas arrangement data memory and the pair of adjacent base station antennas arrangement data memory in the example shown in FIG. 3;

FIG. 18 is a diagram showing a state of the pair of close base station antennas arrangement data memory and the pair of adjacent base station antennas arrangement data memory shown in FIG. 17 with set values further accumulated as a result of the examples shown in FIG. 4 and FIG. 5;

DETAILED DESCRIPTION OF THE PREFERRED EMBODIMENTS

Figure 1:
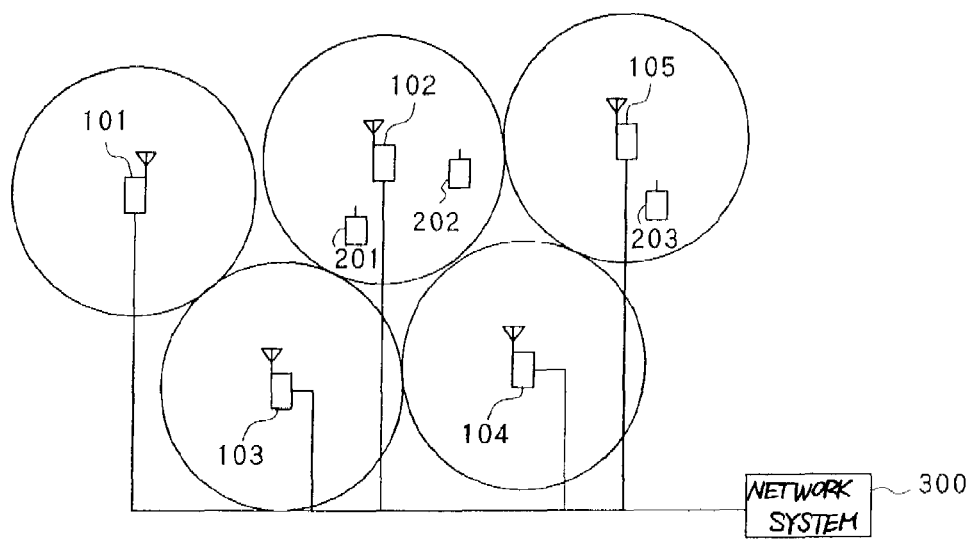
FIG. 1 is a diagram showing an embodiment of a mobile communication system for implementing a method for determining a base station antenna proximity state of the present invention.

FIG. 1 is a diagram showing an embodiment of a mobile communication system for implementing a method for determining a base station antenna proximity state of the present invention.

This embodiment includes base station antennas 101 to 105, mobile terminals 201 to 203 in a service area formed by base station antennas 101 to 105, and network system 300 that is network controlling means for controlling base station antennas 101 to 105 as shown in FIG. 1. Base station antennas 101 to 105 communicate with mobile terminals 201 to 203 under the control of network system 300. Although it is assumed that the directivity of each base station antennas 101 to 105 is omnidirectional (360°) here, any directivity such as 60° or 120° may be used.

Figure 2:
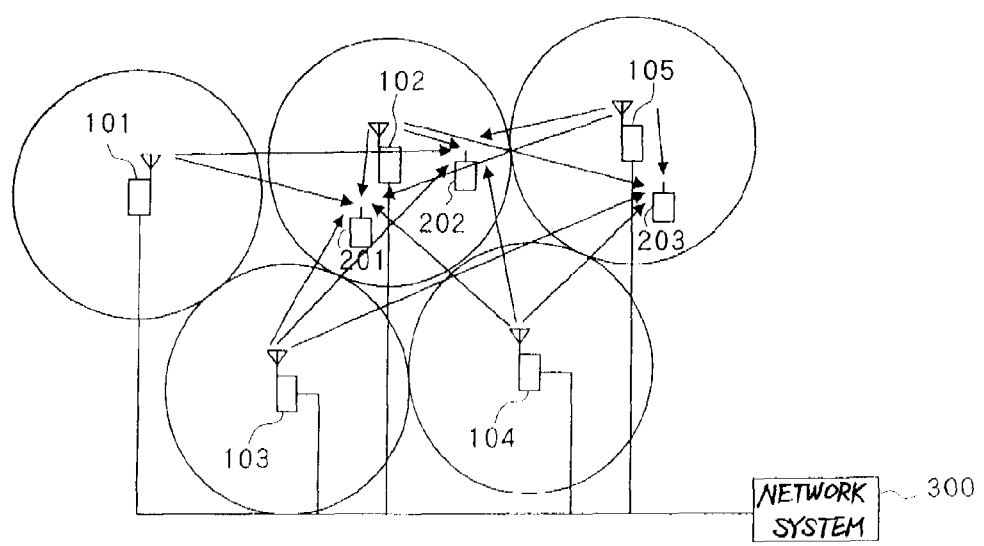
FIG. 2 is a diagram showing the electrical wave from a base station antenna detected by mobile terminals in the mobile communication system shown in FIG. 1.

FIG. 2 is a diagram showing the electrical wave from a base station antenna detected by mobile terminals 201 to 203 in the mobile communication system shown in FIG. 1.

In the mobile communication system shown in FIG. 1, mobile terminals 201, 202 detect electrical waves from base station antennas 101 to 105 respectively and mobile terminal 203 detects electrical waves from base station antennas 102 to 105 without detecting an electrical wave from base station 101 as shown in FIG. 2. As such, the mobile terminal has a feature of detecting different base station antennas depending on the position of the mobile terminal in the service area. It is also a feature that the strength of the electrical wave to be detected by a mobile terminal differs for each mobile terminal.

There are various methods for each of mobile terminals 201 to 203 to measure the strength of the received signal from surrounding base station antennas. These include a method by which each of mobile terminals 201 to 203 periodically measure the strength of the received signal from base station antennas 101 to 105 during a waiting state without transmitting nor receiving a signal resulting from user's communication or during communication for transmitting or receiving a signal resulting from user's communication and notify the strength of the received signal to the network system 300, a method by which each of the mobile terminals 201 to 203 measure the strength of the received signal in response to an instruction from the network system 300 and notify the strength of the received signal to the network system 300 when mobile terminals 201 to 203 are about to start communication, a method by which each of mobile terminals 201 to 203 autonomously measure the strength of the received signal and notify the strength of the received signal to the network system 300 if the mobile terminal needs to change connection to another base station in order to maintain communication as mobile terminals 201 to 203 move in the service area, and a method by which network system 300 instructs all the mobile terminals or some mobile terminals to measure and to notify the measurement when network system 300 recognizes that a particular area or all the areas need to be measured as required.

Figure 3:
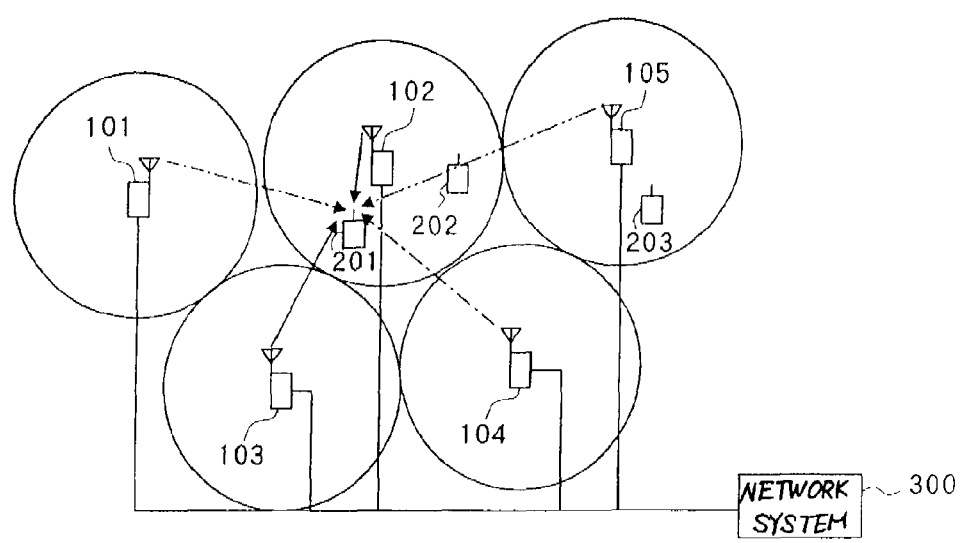
FIG. 3 is a diagram showing the strength of the electrical wave that the mobile terminal detects from the surrounding base station antennas in the mobile communication system shown in FIG. 1.

FIG. 3 is a diagram showing the strength of the electrical wave from surrounding base station antennas 101 to 105 in the mobile communication system shown in FIG. 1 that is detected by mobile terminal 201.

As shown in FIG. 3, mobile terminal 201 is in the area of base station antenna 102 facing base station antenna 103. Therefore, the electrical waves from base station antennas 102 and 103 that are detected have sufficient strength. Since mobile terminal 201 is at a distance from base station antennas 101 and 104, the electrical waves from base station antennas 101, 104 that are detected have a somewhat low strength. Because mobile terminal 201 is at a distance from base station antenna 105, the electrical wave from base station antenna 105 that is detected has much lower strength.

In order to indicate a difference between the strength of the received signal, the strength of electrical waves detected by mobile terminal 201 in the figure is shown by three types of line. That is to say, a case in which an electrical wave that has sufficient strength can be detected, i.e., those from base station antennas 102 and 103 are shown by "solid lines"; a case in which an electrical wave that has somewhat low strength can be detected, i.e., those from base station antennas 101 and 104 are shown by "dashed lines"; and a case in which an electrical wave that has much lower strength can be detected, i.e., that from base station 105 is shown by a "chain double-dashed line."

Figure 4:
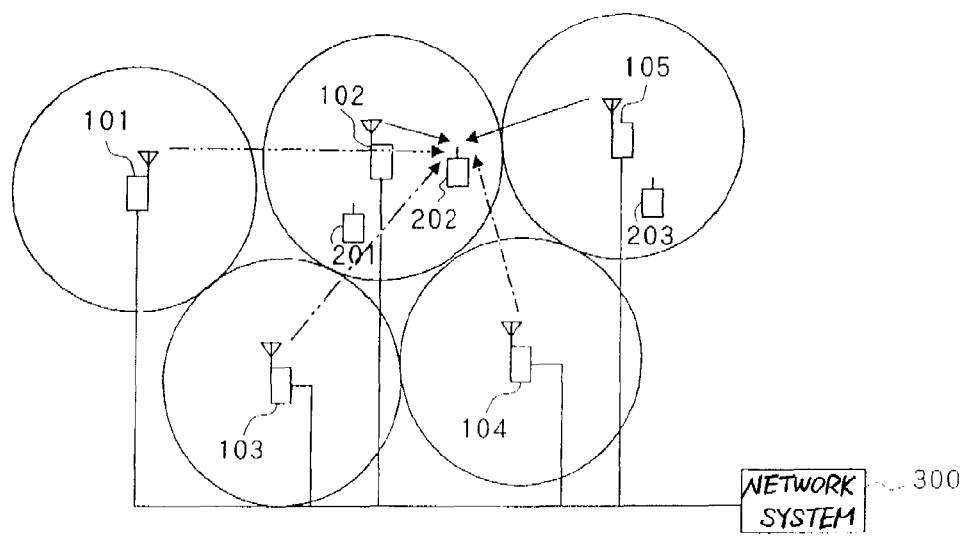
FIG. 4 is a diagram showing the strength of the electrical wave that the mobile terminal detects from the surrounding base station antennas in the mobile communication system shown in FIG. 1.

FIG. 4 is a diagram showing the strength of the electrical wave from surrounding base station antennas 101 to 105 in the mobile communication system shown in FIG. 1 that is detected by mobile terminal 202.

As shown in FIG. 4, mobile terminal 202 is in the area of base station antenna 102, facing base station antenna 105. Therefore, the electrical waves from base station antenna 102 and 105 that are detected have sufficient strength. Since mobile terminal 202 is at a distance from base station antenna 104, the electrical wave from base station antenna 104 that is detected have a somewhat low strength. Because mobile terminal 202 is at a distance from base station antennas 101 and 103, the electrical waves from base station antennas 101 and 203 that are detected has much lower strength.

Figure 5:
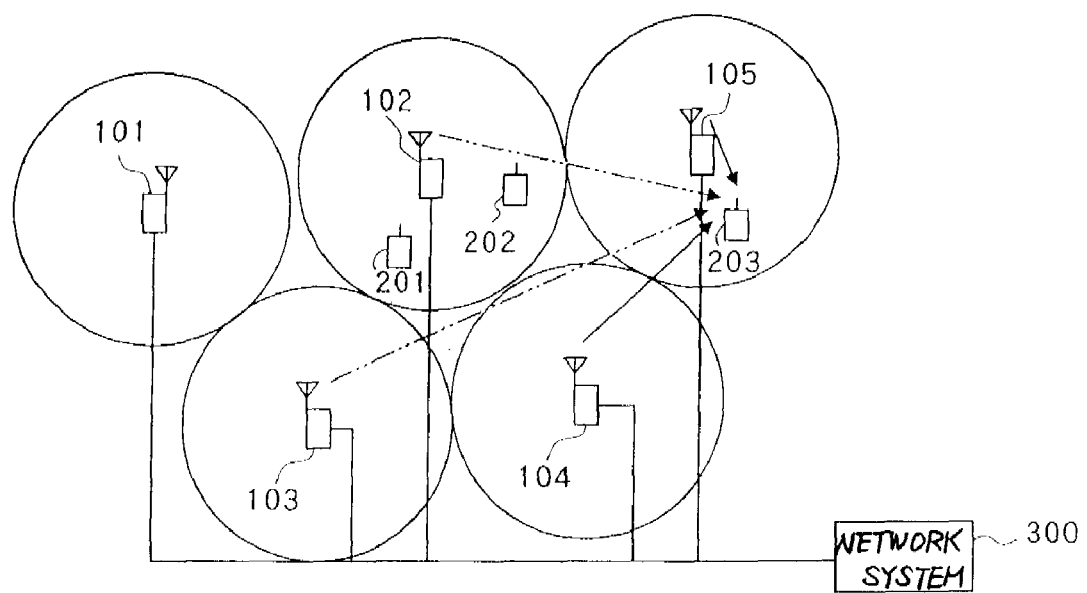
FIG. 5 is a diagram showing the strength of the electrical wave that the mobile terminal detects from the surrounding base station antennas in the mobile communication system shown in FIG. 1.

FIG. 5 is a diagram showing the strength of the electrical wave from surrounding base station antennas 101 to 105 in the mobile communication system shown in FIG. 1 that is detected by mobile terminal 203.

As shown in FIG. 5, mobile terminal 203 is in the area of the base station antenna 105, facing base station antenna 104. Therefore, electrical waves from the base station antennas 105 and 104 that are detected have sufficient strength. Because mobile terminal 203 is at a distance from base station antennas 102 and 103, electrical waves from base station antennas 102,104 and that have much lower strength can be detected. Since mobile terminal 203 is quite far from base station antenna 101, no electrical wave can be detected.

A method for estimating the physical relationship between the abovementioned mobile terminals 201 to 203 and base station antennas 101 to 105 is introduced.

Figure 6:
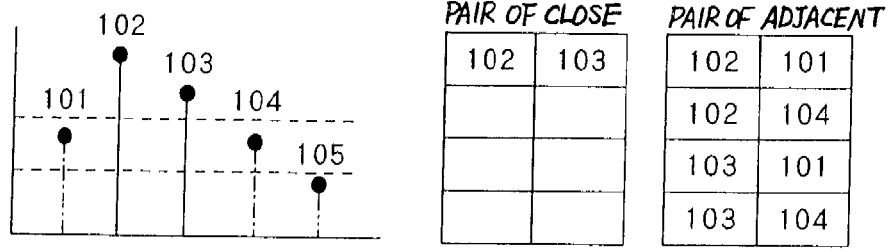
FIG. 6 is a diagram showing the strength of the electrical wave that the mobile terminal receives from the base station antennas in the state show in FIG. 3.

FIG. 6 is a diagram showing the strength of the electrical wave that mobile terminal 201 receives from the base station antennas in the state show in FIG. 3.

As shown in FIG. 6, the strength of the received signal from the plurality of base station antennas at mobile terminal 201 is classified into sufficient strength in the first level, somewhat low strength in the second level, and much lower strength in the third level according to two thresholds denoted by dashed lines in the figure. A threshold for classifying the strength of the received signal into the first level and the second level is an upper threshold U, and a threshold for classifying the strength of the received signal into the second level and the third level is a lower threshold L. Then the strength of the electrical waves that mobile terminal 201 receives from base station antennas 101 to 105 is shown by histogram.

Classification of the strength of the received signal of an electrical wave from a base station antenna is performed by considering the strength of the received signal at upper threshold U or higher as sufficient strength and calling the antennas a group of strong receiving base station antennas, by considering the strength of the received signal less than upper threshold U, and at lower threshold L or higher as a somewhat bit low strength and calling the antennas a group of medium receiving base station antennas, and by considering the strength of the received signal that is less than lower threshold L as much lower strength and calling the antennas a group of weak receiving base station antennas.

The types of line for the base station antenna and for the mobile terminal differ in FIG. 3 because of such determination. In FIG. 6 as in FIG. 3, base station antennas 102 and 103 whose strength of the received signal at upper threshold U or higher are classified into the group of strong receiving base station antennas that have sufficient strength, base station antennas 101 and 104 whose strength of the received signal is less than upper threshold U and at lower threshold L or higher are classified into the group of medium receiving base station antennas with a somewhat bit low strength, and base station antenna 105 whose strength of the received signal is less than lower threshold L is classified into the group of weak receiving base station antennas that has much lower strength.

Two tables shown in FIG. 6 are tables for classifying the close relationship or adjacent relationship in the areas covered by base station antennas.

This means that the strength of the electrical wave received from two base station antennas 102 and 103 is at upper threshold U or higher. That also means that they are a pair of base station antennas placed close to each other in terms of propagation space as seen from mobile terminal 201. Here, the areas covered by base station antennas 102 and 103 are considered as close to each other or have a similar physical relationship. The pair of base station antennas 102 and 103 is called a pair of close base station antennas. It can be recognized from FIG. 3 that the areas covered by the pair of close base station antennas, i.e., base station antennas 102 and 103 face each other. Therefore, validity of the classification can be confirmed. In the example shown in FIG. 6, the strength of the received signal from both two base station antennas 102 and 103 is at upper threshold U or higher, however, if the strength of the received signal from the base station antennas by more than the number of them is at upper threshold U or more, any two of the base station antennas are considered as a pair. For example, if the strength of the received signal from three base station antennas of base station antennas 101 to 103 is at upper threshold U or higher, the pair of base station antennas stored in the table is base station antennas 101 and 102, base station antennas 101 and 103, and base station antennas 102 and 103.

The table on the right in the figure stores a base station antenna that belongs to the group of strong receiving base station antennas and stores a base station antenna that belongs to the group of medium receiving base station antennas as a pair. That is to say, it stores each of the four pairs of; a pair of base station antenna 102 belonging to the group of the strong receiving base station antennas and base station antenna 101 belonging to the group of the medium receiving base station antennas, a pair of base station antenna 102 and base station antenna 104 belonging to the group of medium receiving base station antennas, a pair of base station antenna 103 belonging to the group of the strong receiving base station antennas and base station antenna 101, and a pair of base station antenna 103 and base station antenna 104.

That means that one of the two base station antennas belongs to the group of strong receiving base station antennas whose strength of the received signal is at upper threshold U or more, and the other of the two base station antennas belongs to the group of medium receiving base station antennas whose strength of the received signal is less than upper threshold U and at lower threshold L or more. That also means that they are a pair in which one of them is the strong receiving base station antenna and the other is the medium receiving base station antenna as seen from a mobile terminal. Although they are not as close as those of the pair of close base station antennas, they are considered as a pair of base station antennas adjacent to each other with a certain distance there-between. The pair of the base station antennas is called the pair of adjacent base station antennas. Validity of the classification can be confirmed for the pair of adjacent base station antennas, i.e., four pairs of; a pair of base station antenna 102 and 101, a pair of base station antenna 102 and 104, a pair of base station antenna 103 and 101, and a pair of base station antenna 103 and 104, since it can be confirmed that the areas covered by base station antennas 102 and 103 are adjacent to each other and that base station antenna 101 and base station antenna 104, both belonging to the group of medium receiving base station antennas, are at a distant from each other in terms of propagation space from FIG. 3, thus, the pair, i.e., base station antenna 101 and base station antenna 104, are eliminated from the pair of adjacent base station antennas.

Figure 7:
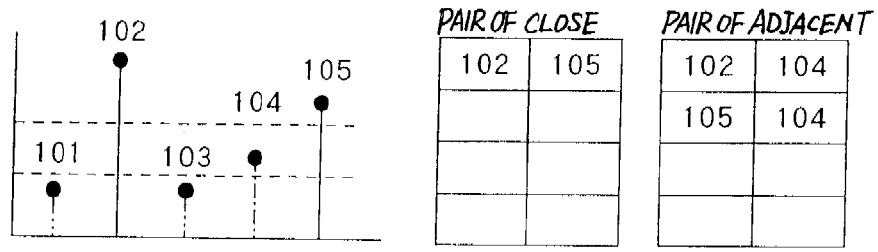
FIG. 7 is a diagram showing the strength of the electrical wave that the mobile terminal receives from the base station antennas in the state show in FIG. 4.

FIG. 7 is a diagram showing the strength of the electrical wave that is received by mobile terminal 202 from the base station antennas in the state shown in FIG. 4, and the strength of the signal that is received by mobile terminal 202 from base station antennas 101 to 105 is shown by histogram.

In FIG. 7, as in FIG. 4, base station antennas 102 and 105, that receive signals having a strength at upper threshold U or higher, are classified into the group of strong receiving base station antennas that have sufficient strength, base stations antenna 104 that receives signals having a strength less than upper threshold U and at lower threshold L or higher are classified into the group of medium receiving base station antennas that have somewhat low strength, and bases station antennas 101 and 103 that receive signals having a strength that is smaller than at lower threshold L are classified into the group of weak receiving base station antennas that have much lower strength.

The table on the left in the figure stores a pair of the base station antennas that belong to the group of strong receiving base station antennas, i.e., base station antennas 102 and 105. That means that they are a pair of base station antennas placed close to each other in terms of propagation space as seen from mobile terminal 202. Here, the areas covered by base station antennas 102 and 105 are considered as adjoining to each other or have a similar physical relationship. Validity of classification can be confirmed for the pair of close base station antennas, i.e., base station antennas 102 and 105, as it can be recognized that the areas covered by base station antennas 102 and 105 face to each other from FIG. 4.

The table on the right in the figure stores a base station antenna that belongs to the group of strong receiving base station antennas and a base station antenna that belongs to the group of medium receiving base station antennas as a pair. That is to say, it stores each of the two pairs of; a pair of base station antenna 102 belonging to the group of the strong receiving base station antennas and base station antenna 104 belonging to the group of the medium receiving base station antennas, and a pair of base station antenna 105 belonging to the group of the strong receiving base station antennas and base station antenna 104. That means that they are a pair in which one of them is the strong receiving base station antenna and the other is the medium receiving base station antenna as seen from mobile terminal 202. Although they are not as close as those of the pair of close base station antennas, they are considered as a pair of adjacent base station antennas that are adjacent to each other with a certain distance there-between.

Validity of the classification can be confirmed for the pair of adjacent base station antennas, i.e., two pairs of; a pair of base station antenna 102 and the base station antenna 104, a pair of base station antenna 105 and base station antenna 104, as it can be confirmed that the areas covered by base station antenna 102 and base station antenna 104 and the areas covered by base station antenna 105 and base station antenna 104 are adjacent to each other.

Figure 8:
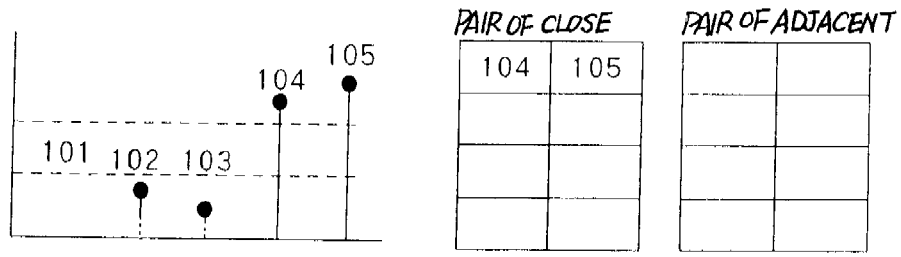
FIG. 8 is a diagram showing the strength of the electrical wave that the mobile terminal receives from the base station antennas in the state show in FIG. 5.

FIG. 8 is a diagram showing the strength of the electrical wave that mobile terminal 203 receives from the base station antennas in the state-show in FIG. 5. Then the strength of the signals that mobile terminal 202 receives from base station antennas 101 to 105 is shown by histogram.

In FIG. 8 as in FIG. 5, base station antennas 104 and 105 whose strength of the received signal at upper threshold U or higher are classified into the group of strong receiving base station antennas that have sufficient strength, bases station antennas 102 and 103 that receive electrical waves having a strength that is smaller than at lower threshold L are classified into the group of weak receiving base station antennas that have much lower strength. In such a case, it is recognized that base station antenna 101 has strength that cannot be detected by mobile terminal 203.

The table on the left in the figure stores a pair of the base station antennas that belong to the group of strong receiving base station antennas, i.e., base station antennas 104 and 105. That means that they are a pair of base station antennas placed close to each other in terms of propagation space as seen from mobile terminal 203. The areas covered by base station antennas 104 and 105 are considered as adjoining to each other or have a similar physical relationship. Validity of the classification can be confirmed for base station antennas 104 and 105 since it can be recognized from FIG. 5 that that the areas covered by base station antennas 104 and 105 face each other.

As no base station antenna belonging to the group of medium receiving base station antennas is present, the table on the right in the figure shows that no pair of adjacent base station antennas adjacent to each other with a certain distance there-between is present.

As mentioned above, whether individual base station antennas 101 to 105 are in a pair of close base station antennas or in a pair of adjacent base station antennas or otherwise, is based on the strength of the signals that are received from base stations 101 to 105 by individual mobile terminals 201 to 203. This shows the physical relationship between the area covered by the individual base station antennas and the area covered by the other base station antennas. The physical relationship among individual base station antennas is statistically derived in the area in which mobile terminals that are distributed as mobile terminals 201 to 203 measure the strength of the received signal of the electrical wave from base station antennas 101 to 105, the measurements are collected and accumulated at network system 300.

Figures 9, 10:
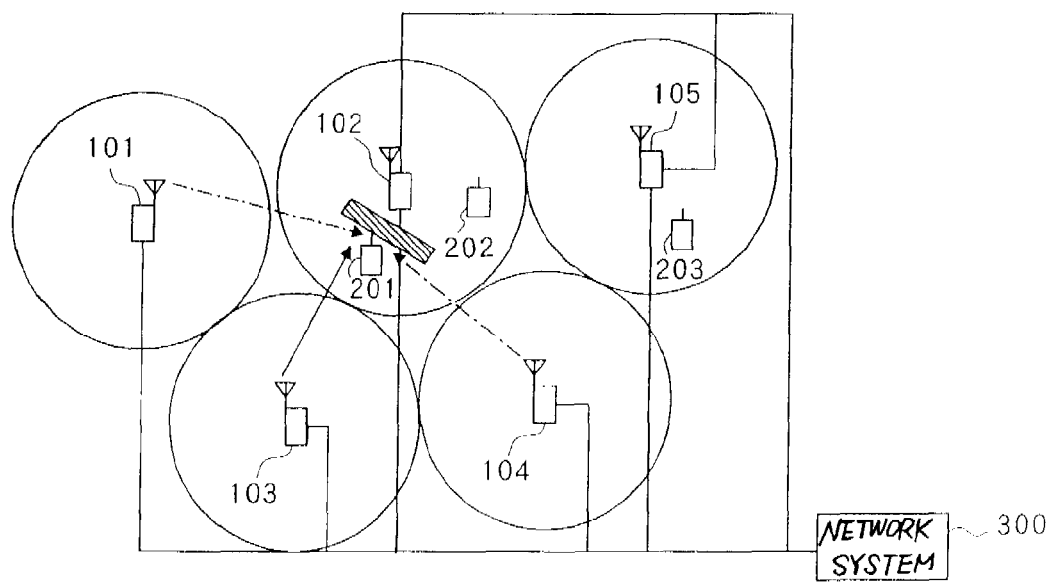
FIG. 9 is a table showing an accumulation of information shown in FIG. 6 to FIG. 8.
FIG. 10 is a diagram showing an example of an urban area or the like with clusters of buildings in the mobile communication system shown in FIG. 1.

FIG. 9 is a table showing an accumulation of information shown in FIG. 6 to FIG. 8. Referring to FIG. 9, the physical relationship of base station antennas in a service area can be recognized. The two columns at the left in the table show the numbers of the base station antennas, that makes a pair of a combination of two antennas. The third column from the left shows the number of times that it is determined that the pair of two base station antennas indicated in the first column and the second column is a pair of close base station antennas. The fourth column from the left shows the number of times that it is determined that the pair of two base station antennas indicated in the first column and the second column is a pair of adjacent base station antennas.

As shown in FIG. 9, the number of times that it is determined the pair of base station antenna 101 and 102 is a pair of adjacent base station antennas is one, which is derived from the result shown in FIG. 6. Similarly, the number of times that it is determined the pair of base station antennas 101 and 103 is a pair of adjacent base station antennas is one, which is also derived from the result shown in FIG. 6.

Since the pair of base station antennas 101 and 104 and the pair of base station antennas 101 and 105 do not appear in FIG. 6 to FIG. 8, both of the number of times for determining that they are as the pair of adjacent base station antennas and the pair of close base station antennas is zero. The number of times that it is determined that the pair of base station antennas 102 and 103 is a pair of close base station antennas is one, which is derived from the result shown in FIG. 6. The number of times that it is determined the pair of base station antenna 102 and 104 is a pair of adjacent base station antennas is two, which is derived from the result shown in FIGS. 6 and 7. Similarly, the number of times that it is determined that the pair of base station antennas 102 and 105 is a pair of close base station antennas is derived as one from the result shown in FIG. 7. The number of times that it is determined that the pair of base station antennas 103 and 104 as a pair of adjacent base station antennas is derived as one from the result shown in FIG. 6. The number of times that it is determined that the pair of base station antennas 103 and 105 is a pair of close base station antennas and a pair of adjacent base station antennas is derived as zero. The number of times that it is determined that the pair of base station antennas 104 and 105 is a pair of adjacent base station antennas is derived as one from the result shown in FIG. 7. The number of times that it is determined as the pair of close base station antennas is derived as one from the result shown in FIG. 8.

The result shown in FIG. 9 shows a statistical result that takes into consideration the actual place of the mobile terminal and the distribution density of mobile terminals, because the result is accumulated by network system 300 based on the strength of the received signal from the surrounding base station antennas and which is measured at the locations where mobile terminals 201 to 203 are. The result reflects the contribution from the base station antennas to the mobile terminal.

Figure 11:
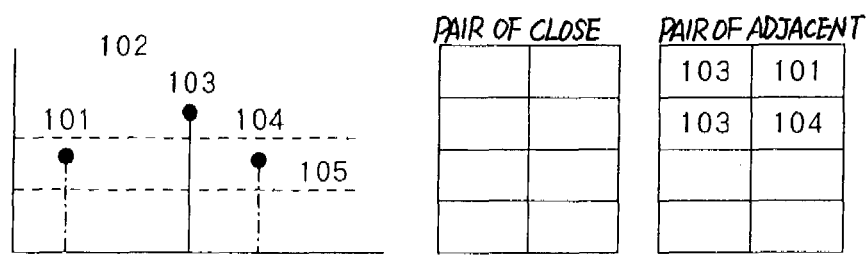
FIG. 11 is a diagram showing a result derived in the state shown in FIG. 10.

FIG. 10 is a diagram showing an example of an urban area or the like with clusters of buildings in the mobile communication system shown in FIG. 1. FIG. 11 is a diagram showing a result derived in the state shown in FIG. 10.

The area covered by the mobile communication system includes places where many people are such as an urban area or the like. In such a state, the strength of the received signal is not necessarily determined by a simple geographical arrangement of mobile terminals and base station antennas, i.e., geographical distances between the mobile terminals and base stations, thus, the strength of the received signal changes depending on the sizes of buildings between them and the presence of the building that reflects an electrical wave.

In the example shown in FIG. 10, the geographical positions of base station antennas 101 to 105 and mobile terminals 201 to 203 are the same as those shown in FIG. 3 except that the building blocks base station antenna 102 and mobile terminal 201. In such a case, as shown in FIG. 11, the received signal from base station 102 cannot have a strength at upper threshold U or higher, as that in FIG. 3, because the strength is lower than at lower threshold L. Therefore, the pair of base station antennas 102 and 103 that is a pair of close base station antennas derived from the state of FIG. 3 is not derived in FIG.

11, and two pairs of adjacent base station antennas of the pair of base station antennas 101 and 102 and the pair of base station antennas 102 and 104 are also not derived in FIG. 11. That means that the state of electrical wave propagation in the service area obtained in the state shown in FIG. 3 has changed, suggesting that information derived in the state shown in FIG. 3 where the building in concern is not present is useless in the state shown in FIG. 10 where the building in concern is present.

Here, the state shown in FIG. 3 and the state shown in FIG. 11 are reversible to each other. For example, it can be considered that FIG. 3 shows a state before a building is constructed and FIG. 11 shows a state after the building has been constructed. In contrast, it can be considered that a building blocks the received signal from a base station antenna in FIG. 11, and after the building is removed, the state reverts to that shown in FIG. 3. The state shown in FIG. 11 is not limited to the state in which an electrical wave is blocked by a building and may include a state in which the wall of a building reflects the electrical wave, resulting in the electrical wave being transmitted in a direction other than that originally considered. It should be considered that the environment for the electrical wave propagation in a service area is always changing.

Figure 12:
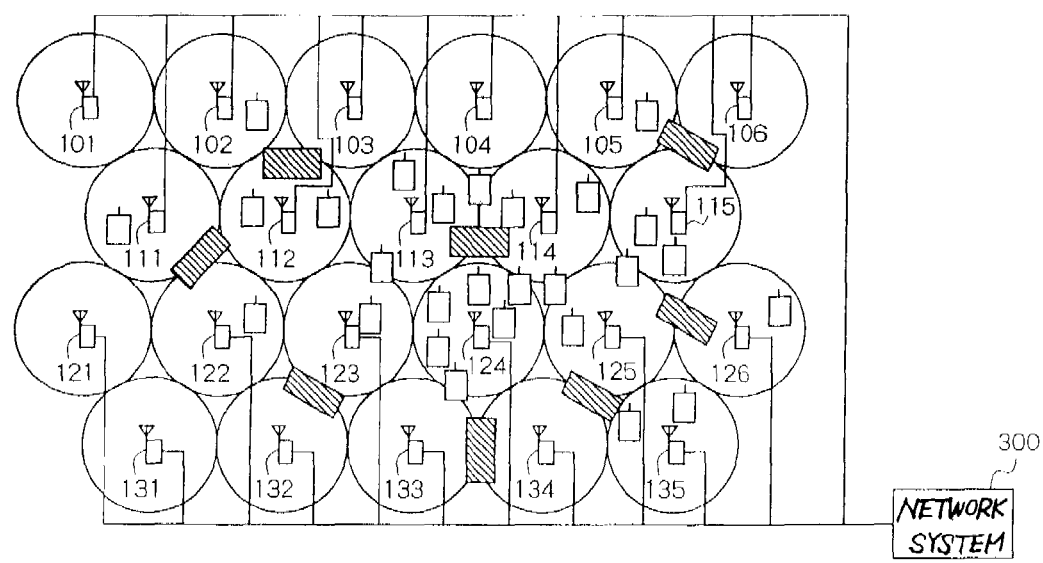
FIG. 12 is a diagram showing an example of a service area state consisting of a great number of base station antennas for that shown in FIG. 1.

FIG. 12 is a diagram showing an example of the state of a service area state consisting of a great number of base station antennas as shown in FIG. 1.

As shown in FIG. 12, in the example, the service area includes 22 base station antennas, base station antennas 101 to 106, 111 to 115, 121 to 126 and 131 to 135, in which a great number of mobile terminals are distributed. The buildings are also distributed as in the case shown in FIG. 10. Mobile terminals are also distributed in each base station are with a different density. For example, a great number of the mobile terminals are distributed near base station antennas 113, 114 and 124. Such a distribution state is not constant and has the feature that it changes from time to time depending on the time, day of the week (whether it is a holiday or weekday) or whether an event is held or not.

The present invention has a feature of being able to comply with changes in the state of electrical wave propagation in the service area that is always changing.

How the information indicated in the abovementioned configuration is processed will be described.

The abovementioned information is such that the strength of the received signal measured by mobile terminals 201 to 203 is transmitted to network system 300 and accumulated in the arrangement of data memory (not shown) provided in network system 300.

First, initialization of the arrangement of data memory in network system 300 will be described.

Figure 13:
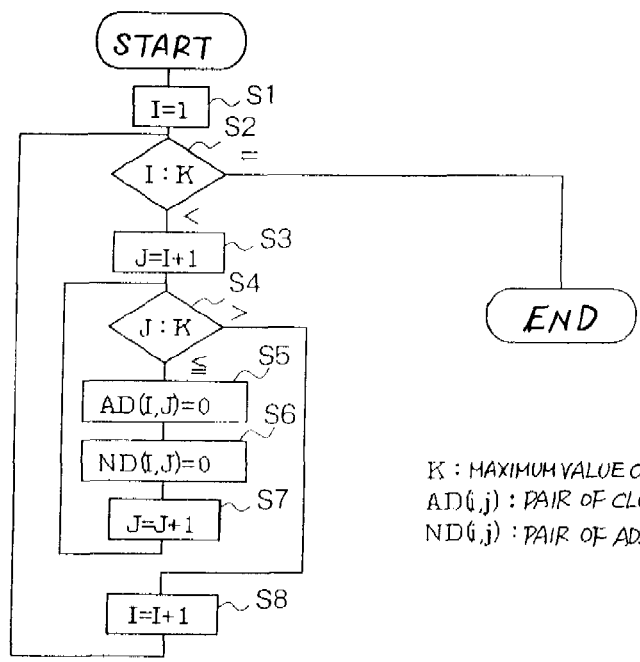
FIG. 13 is a flowchart describing initialization of an arrangement of data memory in the network system shown in FIG. 1.

FIG. 13 is a flowchart describing initialization of an arrangement of data memory in network system 300 shown in FIG. 1. In the embodiment, it is assumed that the number of base stations is K. In the embodiment, to simplify of the description of processing, an indicator for identifying a base station antenna is such that base station antenna 101 to 105 in FIG. 3 correspond to base station antenna number 1, base station antenna number 2, the base station antenna number 3 and the like.

In network system 300, first at step 1, one of the pair of base station antennas is set to first base station antenna 1. If base station antenna 1 is within K at step 2, second base station antenna 2 is set as the base station antenna that corresponds to base station antenna 1 at step 3. Then, if base station antenna 2 is within K at step 4, the arrangement data memories for accumulating relationship between two base station antennas 1 and 2, i.e., pair of close base station antennas arrangement data memory AD(I, J) for deriving the pair of close base station antennas and pair of adjacent base station antennas arrangement data memory ND(I, J) for deriving the pair of adjacent base station antennas are cleared at steps 5 and 6.

Then, at steps 7 and 8, I and J are incremented respectively and the abovementioned processing is performed to the $K^{th}$ base station antenna.

If the number of the base station antennas is K, the number of storages of the arrangement of data memory to be used is $\{K \times (K-1)\} \div 2$. If five base station antennas are present as shown in FIG. 3 to FIG. 5, for example, the number of storages of the arrangement of data memory to be used is 10. This proves what is shown in FIG. 9. In this case, the value 0 is set in pair of close base station antennas arrangement data memory AD(I, J), i.e., the storages of AD(1, 2), AD(1, 3), AD(1, 4), AD(1, 5), AD(2, 3), AD(2, 4), AD(2, 5), AD(3, 4), AD(3, 5) and AD(4, 5). Similarly, the value 0 is set in pair of adjacent base station antennas arrangement data memory ND(I, J), i.e., the storages of ND(1, 2), ND(1, 3), ND(1, 4), ND(1, 5), ND(2, 3), ND(2, 4), ND(2, 5), ND(3, 4), ND(3, 5) and ND(4, 5).

Now, the process of classifying the strength of the received signal from the plurality of base station antennas 101 to 105 that is measured by mobile terminals 201 to 203, into any of "at the high level threshold or more", "less than the high level threshold and at the low level threshold or more", and "less than the low level threshold", will be described.

Figure 14:
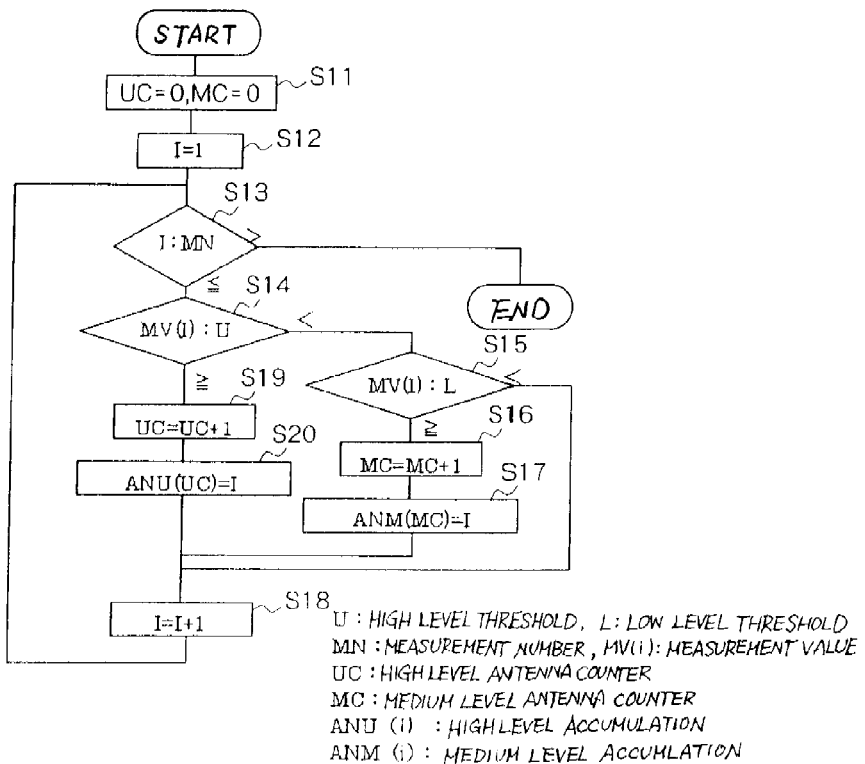
FIG. 14 is a flowchart describing the process for classifying the strength of the received signal measured by the mobile terminals into three levels in the network system in the mobile communication system shown in FIG. 1.
Figure 15:
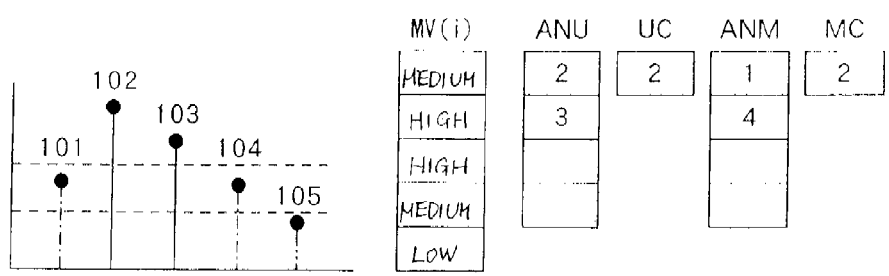
FIG. 15 is a diagram showing a result of the process according to the flowchart shown in FIG. 14 based on the case shown in FIG. 3.

FIG. 14 is a flowchart describing the process for classifying the strength of the received signal, measured by mobile terminals 201 to 203, into three levels in network system 300 in the mobile communication system shown in FIG. 1. FIG. 15 is a diagram showing a result of the processing according to the flowchart shown in FIG. 14 based on the case shown in FIG. 3.

The operation of the flowchart of FIG. 14 will be described with reference to a case shown in FIG. 3 as an example. In the case shown in FIG. 3, mobile terminal 201 measures the strength of the received signal from base station antennas 101 to 105 and transmits the measurement to network system 300. Therefore, MN=5. The strength of the received signal from the base station antennas is such that the strength of the received signal from base station antenna 101 is less than the high level threshold and is at the low level threshold or higher, that from base station antenna 102 it is at high level threshold or more, that from base station antenna 103 it is at the high level threshold or more, that from base station antenna 104 it is less than the high level threshold and is at the low level threshold or more, and that from base station antenna 105 it is less than the low level threshold as is apparent from the left diagram of FIG. 15. UC is the high level antenna counter and MC is the medium level antenna counter, and they are used for classifying the strength of the received signal from the base station antennas in which 0 is set as an initial value.

As the value of MN is 5, the flow shown in FIG. 14 loops five times.

In network system 300, high level antenna counter UC and medium level antenna counter MC are initialized respectively at step 11, and base station antenna number 1 for the first time is set at step 12. If base station antenna number 1 is the measured number of five or under at step 13, the processing below will be performed in network system 300.

First, the strength of the received signal form base station antenna 101 is compared with the high level threshold at step 14 for the first time. As the strength of the received signal from base station antenna 101 is less than the high level threshold, the strength of the received signal from base station antenna 101 is compared with the lower threshold value at step 15. As the strength of the received signal from base station antenna 101 is at the low level threshold or more, MV(1) is less than U and is at L or more, then at step 16, +1 is added to MC to make it 1. Then at step 17, 1 is set to ANM(1) and at step 18, I becomes 2.

As the strength of the received signal from base station antenna 102 is at the high level or more for the second time, MV(2) is at U or more, then at step 19, +1 is added to UC to make it 1. Then at step 20, 2 is set to ANU(1) and I becomes 3.

As the strength of the received signal form base station antenna 103 is at the high level or more for the third time, MV(3) is at U or more, +1 is added to UC to make it 2, 3 is set to ANU(2) and I becomes 4.

As MV(4) is less than U and is at L or more for the fourth time, +1 is added to MC to make it 2, 4 is set to ANM(2) and I becomes 5.

As MV(5) is less than L for the fifth time, I becomes 6. As I is 6, the loop ends at the time more than 5 for MN.

With the abovementioned processing, the result shown in FIG. 15 is obtained.

Now, the processing of accumulated statistical information to determine whether any two base station antennas have a close relationship or an adjacent relationship based upon the classification result of the strength of the received signal from the base station antenna, i.e., the classification result according to which the strength of the received signal is at the high level threshold or more, is less than at the high level threshold, is at the low level threshold or more, will be described with reference to a case shown in FIG. 3.

Figure 16:
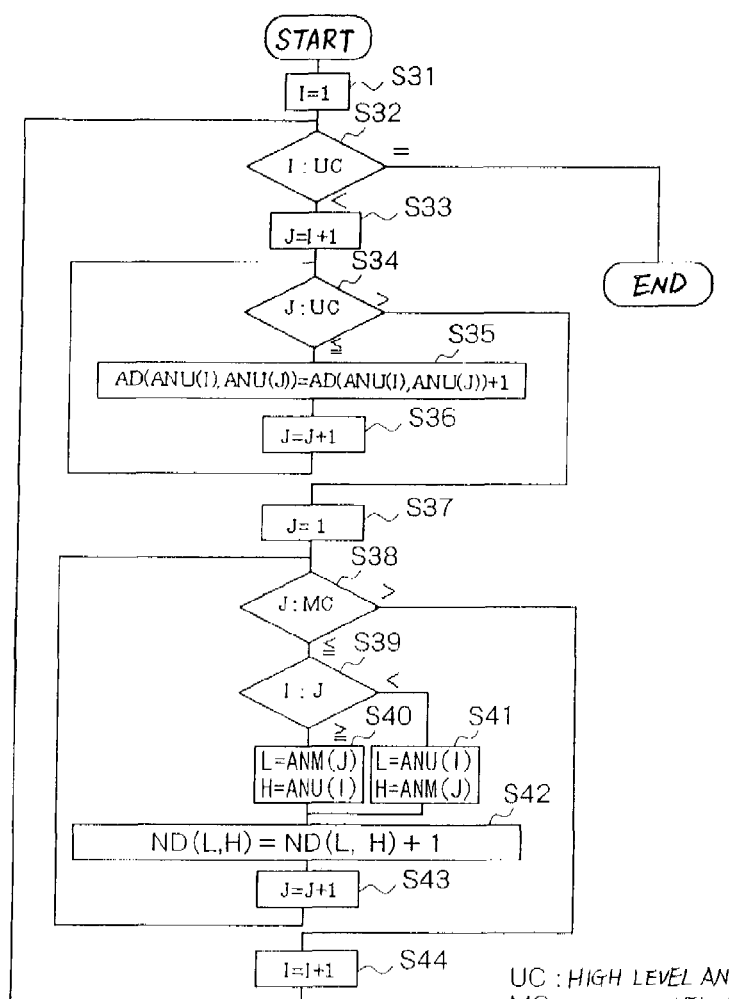
FIG. 16 is a flowchart describing the process for determining a proximity state of two base station antennas based on the classified result of the process of the flowchart shown in FIG. 14.

FIG. 16 is a flowchart describing the processing for determining a proximity state of two base station antennas based on the classified result of the processing of the flowchart shown in FIG. 14.

The contents of pair of close base station antennas arrangement data memories AD(1,5) to AD(4,5) and pair of adjacent base station antennas arrangement data memories ND(1,5) to ND(4, 5), which are the output result of the processing, are set to 0 as an initial value in the processing shown in FIG. 13.

As UC is the high level antenna counter and 2 is set to it, it loops twice as a big loop. That big loop includes a loop consisting of steps 32 to 36 and a loop consisting of steps 38 to 43. The relationship of the close base station antenna is determined in the loop consisting of steps 32 to 36 and the relationship of the adjacent base station antenna is determined in the loop consisting of steps 38 to 43.

As UC is 2 for the loop consisting of steps 32 to 36, it loops once. In steps 31 and 32, comparison with the value of the high level antenna counter is performed from base station antenna 101 in order. Then at step 33, the base station antenna becomes a pair with another base station antenna. If the base station antenna that makes up the pair is at the high level antenna counter or less at step 34, the base station antennas accumulated in the high level accumulation memory ANU are set as pair of close antennas and 1 is added to the close base station antenna pair table AD(i, j). Then at step 36, the base station antennas that make up a pair are updated and the same processing is performed. In the example shown in FIG. 3, 1 is added to close base station antenna pair table AD(2, 3) as a result.

The loop consisting of steps 38 to 43 loops four times in total, twice for each of the medium level antenna counters MC since the number of MC is two. At steps 37 and 38, comparison with the value of the medium level antenna counter is performed from base station antenna 101 in order. Further, at step 39, comparison is performed with the base station antenna that makes a pair. Then at steps 40 to 42, the base station antennas accumulated in the high level accumulation memory ANU and the base station antennas accumulated in the medium accumulation memory ANM are set as a pair of adjacent antennas, and 1 is added to the pair of adjacent base station antennas table ND(i, j). Then at steps 43 and 44, the base station antennas are updated and the same processing is performed. In the example shown in FIG. 3, 1 is added to each pair of adjacent base station antennas table ND(1, 2), each pair of adjacent base station antennas table ND(2, 4), each pair of adjacent base station antennas table ND(1, 3) and each pair of adjacent base station antennas table ND(3, 4) as a result.

Here, it is assumed that the contents of pair of close base station antennas data memories AD(1, 5) to AD(4, 5) and pair of adjacent base station antennas data memories ND(1, 5) to ND(4, 5) are set to 0 as an initial value by the processing shown in FIG. 13, and immediately after the processing, the strength of the received signal determination shown in FIG. 3 is performed in FIG. 16. In this case, pair of close base station antennas arrangement data memory AD(2, 3) becomes 1, the pair of adjacent base station antennas table ND(1, 2) becomes 1, the pair of adjacent base station antennas table ND(2, 4) becomes 1, the pair of adjacent base station antennas table ND(1, 3) becomes 1, and the pair of adjacent base station antennas table ND(3, 4) becomes 1.

FIG. 17 is a table showing set values of the pair of close base station antennas arrangement data memory and the pair of adjacent base station antennas arrangement data memory in the example shown in FIG. 3.

As shown in FIG. 17, in the example shown in FIG. 3, pair of close base station antennas arrangement data memory AD(2, 3) is 1, pair of adjacent base station antennas table ND(1, 2) is 1, pair of adjacent base station antennas table ND(2, 4) is 1, pair of adjacent base station antennas table ND(1, 3) is 1, and pair of adjacent base station antennas table ND(3, 4) is 1.

FIG. 18 is a diagram showing a state of the pair of close base station antennas arrangement data memory and the pair of adjacent base station antennas arrangement data memory shown in FIG. 17 with set values further accumulated as a result of the examples shown in FIG. 4 and FIG. 5.

As shown in FIG. 18, by setting the pair of close base station antennas arrangement data memory and the pair of adjacent base station antennas arrangement data memory for all the examples shown in FIG. 3 to FIG. 5, pair of close base station antennas arrangement data memory AD(2, 3) becomes 1, pair of close base station antennas arrangement data memory AD(2, 5) becomes 1, pair of close base station antennas arrangement data memory AD(4, 5) becomes 1, pair of adjacent base station antennas table ND(1, 2) becomes 1, and pair of adjacent base station antennas table ND(1, 3) becomes 1, pair of adjacent base station antennas table ND(2, 4) becomes 2, pair of adjacent base station antennas table ND(3, 4) becomes 1 and pair of adjacent base station antennas table ND(4, 5) becomes 1.

Now, the processing of finally determining the type of close relationship or adjacent relationship individual base station antennas are in according to the contents of pair of close base station antennas arrangement data memory AD(i, j) and pair of adjacent base station antennas arrangement data memory ND(i, j) accumulated by the strength of the received signal evaluation processing by a great number of mobile terminals will be described.

Figure 19:
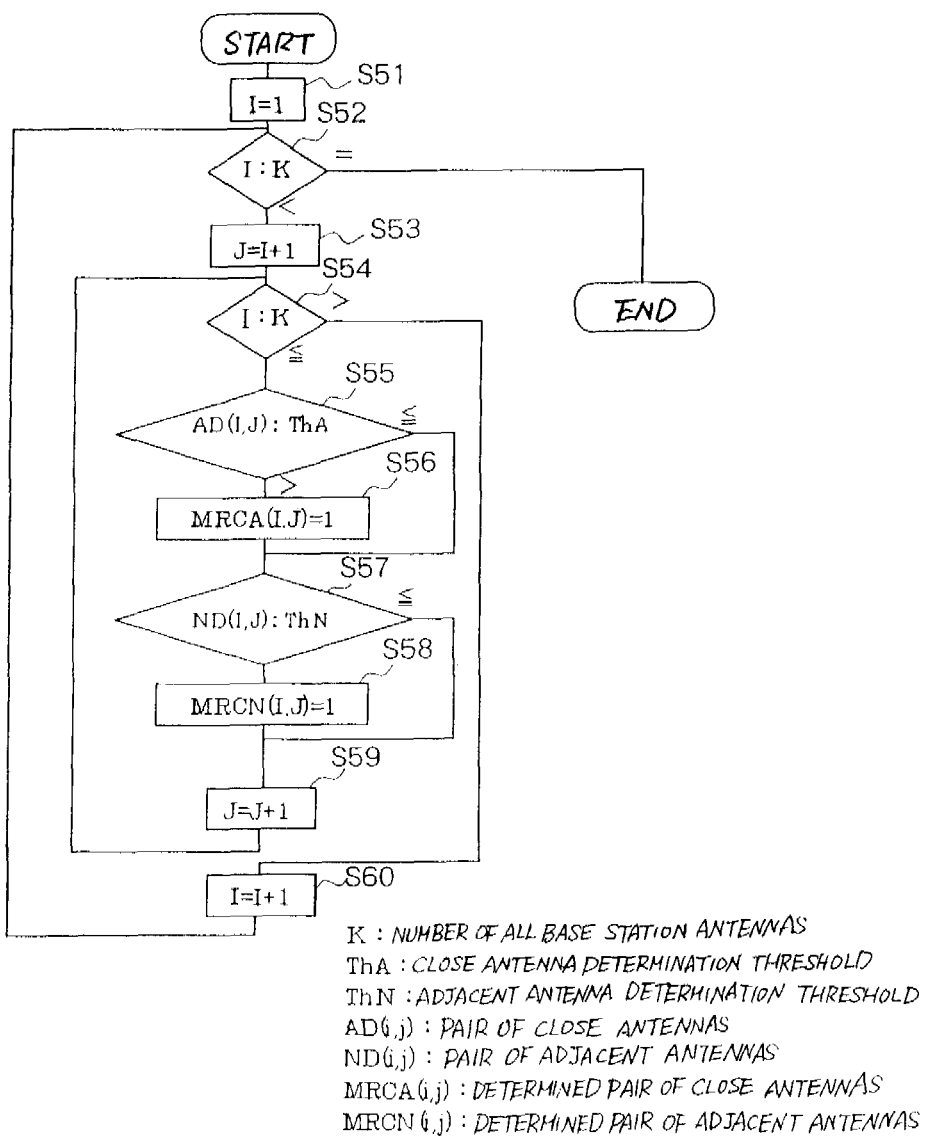
FIG. 19 is a flowchart describing the process for finally determining the type of close relationship or adjacent relationship of any base station antennas in the mobile communication system with a plurality of base station antennas.

FIG. 19 is a flowchart describing the processing for finally determining the type of close relationship or adjacent relationship of any base station antennas in the mobile communication system having a plurality of base station antennas. The processing will be described with reference to an example of the mobile communication system shown in FIG. 1. Here, the base station antennas shown as base station antennas 101 to 105 in FIG. 1 correspond to base station antenna numbers 1 to 5 in FIG. 13, FIG. 14 and FIG. 16.

In network system 300, first at step 51, 1 is set to I as a first base station antenna number. Then if I is less than K at step 52, 2 is set to J as a second base station antenna number that is to make a pair with the first base station antenna number in network system 300 at step 53. If J is K or less at step 54, the size relationship between the contents of pair of the close base station antenna arrangement data memory AD(1, 2), which are used for determining a proximity state of base station antennas, and the close antennas determination threshold ThA are compared in network system 300 at step 55. If the contents of pair of close base station antennas arrangement data memory AD(1, 2) exceeds pair of close antennas determination threshold ThA, it is finally determined as the determined pair of close base station antennas, and at step 56, 1 is set to determined pair of close base station antennas arrangement data memory MRCA(1, 2).

Similarly at step 57, the size relationship between pair of adjacent base station antennas arrangement data memory ND(1, 2) and adjustment antennas determination threshold ThN are compared. If the contents of pair of adjacent base station antennas arrangement data memory ND(1, 2) exceeds adjacent antennas determination threshold ThN, it is finally determined as the determined pair of adjacent base station antennas, and at step 58, 1 is set to determined pair of adjacent base station antennas arrangement data memory MRCN(1, 2). That processing sets the contents of determined pair of close base station antennas data memory MRCA(1, 2) and determined pair of adjacent base station antenna arrangement data memory MRCN(1, 2) if the first base station antenna number is 1 and the second base station antenna number is 2.

Then, the contents of determined pair of close base station antennas arrangement data memory MRCA(i, j) and determined pair of adjacent base station antennas arrangement data memory MRCN(i, j) are set with the second base station antenna number J being 3, 4 and 5, while the first base station antenna number I being left as 1.

Similarly, determined pair of close base station antennas arrangement data memory MRCA(i, j) and determined pair of adjacent base station antennas arrangement data memory MRCN(i, j) are set with first base station antenna number I being 2 to change second base station antenna number J from 3 to 5, first base station antenna number I being 3 to change second base station antenna number J from 4 to 5, first base station antenna number I being 4 and second base station antenna number J being 5.

In this manner, it is decided whether any two pairs of antennas among five base stations are the determined pair of close base station antennas or the determined pair of adjacent base station antennas is determined.

Other Embodiment

Determination on the strength of the received signal from each base station antenna is done according to one kind of threshold, i.e., a single high level threshold and a single low level threshold in the flowchart of FIG. 14. The case where thresholds can differ for each base station antenna depending on location requirements for each antenna or an area of a coverage area will be described. In this case, it is assumed that the threshold with which the strength of the received signal from the base station antenna at a terminal will be compared, is defined as corresponding to the base station antenna that is the closest to the terminal. That is to say, the processing is such that the base station antenna whose threshold is defined according to the receiving power strength at the terminal is selected and referenced in the threshold flowchart that is defined corresponding to the base station antenna.

Figure 20:
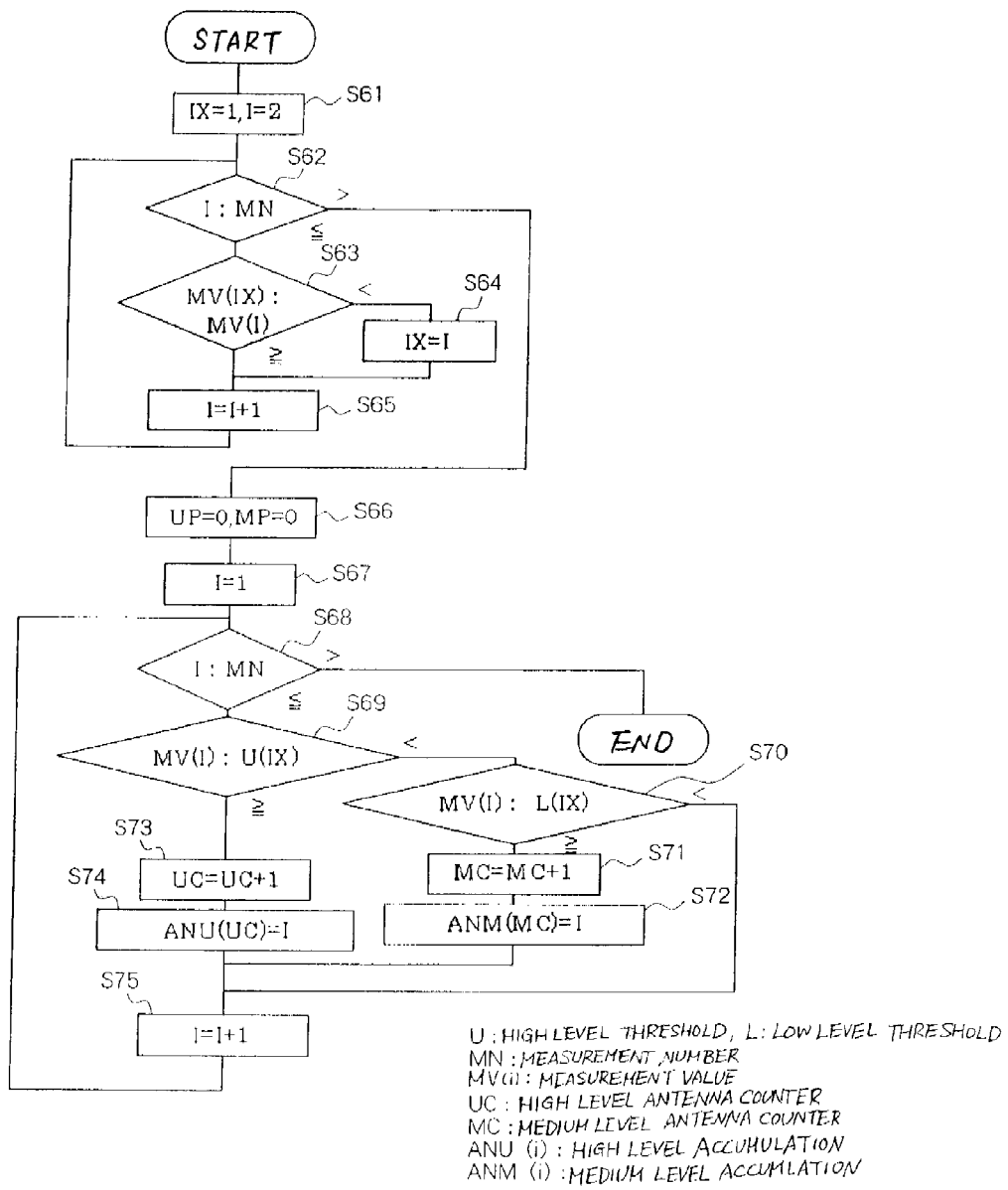
FIG. 20 is a flowchart describing the process for classifying the strength of a received signal, that is measured by mobile terminals, according to a high level and low level threshold, that is different for each base station antenna, into three levels in a network system in the mobile communication system shown in FIG. 1.
Figure 21:
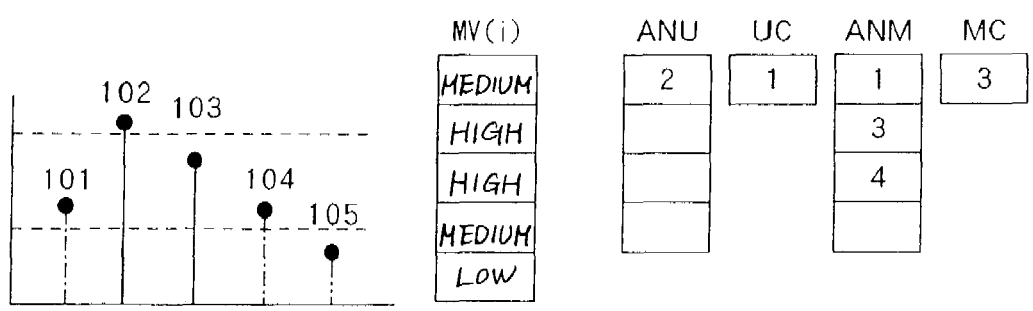
FIG. 21 is a diagram showing a result of the process according to the flowchart shown in FIG. 20.

FIG. 20 is a flowchart describing the processing for classifying the strength of the received signal measured by mobile terminals 201 to 203 into three levels in network system 300 in the mobile communication system shown in FIG. 1. FIG. 21 shows that the same strength of the received signal measured by mobile terminals 201 to 203 as that in FIG. 6 and the thresholds used for classifying the receiving threshold into three levels are different from that in FIG. 6. As a result, FIG. 21 is a diagram in which base station antenna 101 is less than an individual antenna high level threshold and at an individual antenna low level threshold or more, base station antenna 102 is at an individual antenna high level threshold or more, base station antenna 103 is less than an individual antenna high level threshold and at an individual antenna low level threshold or more, base station antenna 104 is less than an individual antenna high level threshold and at a low level threshold or more and base station antenna 105 is less than an individual antenna low level threshold.

The operation of the flowchart of FIG. 20 will be described with reference to the case shown in FIG. 3 as an example. In the case shown in FIG. 3, mobile terminal 201 measures the strength of the received signal from five base station antennas 101 to 105 and transmits the measurements to network system 300. Therefore, MN=5. Here, since the processing is different from that shown in FIG. 14, the terminal determines the strength of the received signal from five base station antennas and finds the base station antenna that has the strongest power to receive a signal.

The strength of the received signal from each base station antenna is as shown in the left diagram in FIG. 21.

As shown in FIG. 20, at step 61, 1 is substituted in IX to provisionally assume that the base station antenna with the strongest receiving power is base station antenna 101, and I=2 is substituted to assume that the base station antenna to be compared with the base station antenna 1 for the receiving power is base station antenna 102.

Next, at step 62, the strength of the power of the signals of the number of base station antennas that are to be estimated is compared with the upper limit of the number of base station antennas. As the number of base station antennas to be compared with is less than the upper limit of the number of the base station antennas to be estimated, the operation proceeds to step for comparing the receiving power of the base station antennas. Here, as IX is 1 and I=2, receiving power MV(1) of base station antenna 101 and receiving power MV(2) of base station antenna 102 are compared at step 63. Since MV(IX), i.e., receiving power MV(1) of base station antenna 101 is lower than MV(I), i.e., receiving power MV(2) of the base station antenna 102, it is determined that MV(I), i.e., receiving power MV(2) of base station antenna 102 is the bigger. At step 64, the value of I indicates that the base station antenna is substituted in IX, i.e., 2 in this case for defining base station antenna 102 as the base station antenna with the strongest receiving power at this moment.

At step 65, 1 is added to I to make 3, then the operation returns to step 62.

At step 62, I and MN are compared with each other. As I is 3 and MN is 5, the operation proceeds to step 63. As IX is 2, I is 3, and MV(IX), is i.e., receiving power MV(2) of base station antenna 102 is not lower than MV(I), i.e., the receiving power MV(3) of base station antenna 103, the operation does nothing here, and 1 is added to I to make 4 at step 65 and the operation returns to step 62.

At step 62, I and MN are compared with each other. As I is 4 and MN is 5, the operation proceeds to step 63. As IX is 2, I is 4, and MV(IX), is i.e., receiving power MV(2) of base station antenna 102 is not lower than receiving power MV(4) of base station antenna 104, the operation does nothing here, and 1 is added to I to make 5 at step 65 and the operation returns to step 62.

Then I and MN are compared with each other, and as I is 5 and MN is 5, the operation proceeds to step 63. As IX is 2, I is 5, and MV(IX), is i.e., receiving power MV(2) of base station antenna 102 is not lower than receiving power MV(5) of base station antenna 105, the operation does nothing here, and 1 is added to I to make 6 at step 65 and the operation returns to step 62.

Then I and MN are compared with each other, and as I is 6 and MN is 5, the operation proceeds to step 66. As IX is 2 at this moment, base station antenna 102 is derived as the base station having the highest receiving power among the antennas from base station antenna 101 to 105.

Processing from step 66 to step 75 is the same as processing at step 13 and step 18 in FIG. 14 except that values of the high level threshold and the low level threshold used for classifying the receiving power from each base station antenna into three levels are not certain values whatever the base station antenna near the terminal, i.e., are not high level threshold U and low level threshold L as in FIG. 14, and the threshold table relating to the base station antenna near the terminal, i.e., base station antenna 102 due to IX being 2, i.e., high level threshold U(2) and low level threshold L(2) are compared with each other.

The right tables in FIG. 21 show values obtained when processing of FIG. 20 ends. Compared with those in FIG. 15, only 2 is in ANU, therefore, 1 is in UC, 1, 3, 4 are in ANM and 3 is in MC since the high level threshold is a little bit higher in FIG. 21. That shows that base station antenna 101 is less than the individual antenna high level threshold and is at the individual antenna low level threshold or more, base station antenna 102 is at the individual antenna high level threshold or more, base station antenna 103 is less than the individual antenna high level threshold and is the individual antenna low level threshold or more, base station antenna 104 is less than the individual antenna high level threshold and is at the low level threshold or more and base station antenna 105 is less than the individual antenna low level threshold, as shown in the left diagram in FIG. 21.

The present invention is adapted to estimate proximity state between a plurality of base station antennas by using measurements from a mobile terminal that actually holds communication connection without using a particular device other than the mobile terminal. Thus, with the present invention, the proximity state of the base station that matches the position or feature of the antenna of the mobile station can be recognized.

The number of particular devices other than conventional mobile terminals is generally less than the number of the mobile terminal and it requires a long time to measure the state of a particular area. Therefore, measurements are collected at different times for different places. In the present invention, a plurality of measurements from mobile terminals distributed widely over a service area can be received and estimated in parallel states that may differ for particular times (day of the week, time) in a short time. That is effective in performing determination again on the proximity state of the base station antenna in a short time that is impossible in any particular devices other than conventional mobile terminals if an initially considered proximity state of the base station antenna changed as a building is built and appears in a service area or a building is pulled down and disappears from the service area. For example, if a building collapses during a disaster such as an earthquake, the road conditions in the service area would become so poor that it would be difficult for a person to move on the roads with various kinds of devices except for a mobile terminal. The present invention is effective because measurements can be easily obtained just by a person walking in the region with a mobile terminal.

While a preferred embodiment of the present invention has been described using specific terms, such description is for illustrative purposes only, and it is to be understood that changes and variations may be made without departing from the spirit or scope of the following claims.

What is claimed is:

1. A mobile communication system comprising:
a mobile terminal;
a plurality of base station antennas that communicate with said mobile terminal; and
network controlling means that controls the plurality of base station antennas;
wherein said mobile terminal measures strength of the received signal from said plurality of base station antennas and transmits the strength of the received signal to said network controlling means; and
said network controlling means determines a proximity state between said plurality of base station antennas based on the strength of the received signal from said plurality of base station antennas transmitted from said mobile terminal.

2. The mobile communication system according to claim 1, wherein
said network controlling means classifies the strength of the received signal from said plurality of base station antennas transmitted from said mobile terminal into three levels of a first level, a second level and a third level in descending order in the strength of the received signal by two thresholds, selects two base station antennas among said plurality of base station antennas, and if the strength of the received signal from both of the two base station antennas are in said first level, determines that the two base station antennas are a pair of close base station antennas whose antennas are close in terms of a propagation space, and if the strength of the received signal from one of the two base station antennas is in the first level and the strength of the received signal from the other of the two base station antennas is in the second level, determines that the two base station antennas are a pair of adjacent base station antennas whose antennas are farther apart from each other in terms of propagation space than are the antennas in said pair of close base station antennas.

3. The mobile communication system according to claim 1, wherein
said mobile terminal measures the strength of the received signal from said plurality of base station antennas while said terminal is not communicating with said plurality of base station antennas to transmit and receive a signal.

4. The mobile communication system according to claim 1, wherein
said mobile terminal measures the strength of the received signal from said plurality of base station antennas while said terminal is communicating with said plurality of base station antennas to transmit and receive a signal.

5. The mobile communication system according to claim 1, wherein
said mobile terminal autonomously measures the strength of the received signal from said plurality of base station antennas.

6. The mobile communication system according to claim 1, wherein
said mobile terminal measures the strength of the received signal from said plurality of base station antennas based on an instruction from said network controlling means.

7. A method for determining base station antenna proximity state for determining the proximity state between a plurality of base station antennas in a mobile communication system comprising a mobile terminal, the plurality of base station antennas that communicate with the mobile terminal, and network controlling means that controls the plurality of base station antennas, comprising:
a step of measuring strength of the received signal from said plurality of base station antennas and transmitting the strength of the received signal to said network controlling means by said mobile terminal; and
a step of determining a proximity state between said plurality of base station antennas based on the strength of the received signal from said plurality of base station antennas transmitted from said mobile terminal by said network controlling means.

8. The method for determining base station antenna proximity state according to claim 7, wherein
said network controlling means classifies the strength of the received signal from said plurality of base station antennas transmitted from said mobile terminal into three levels of a first level, a second level and a third level in descending order in the strength of the received signal by two thresholds, selects two base station antennas among said plurality of base station antennas, and if the strength of the received signal from both of the two base station antennas are in said first level, determines that the two base station antennas are a pair of close base station antennas whose antennas are close in terms of propagation space, and if the strength of the received signal from one of the two base station antennas is in the first level and the strength of the received signal from the other of the two base station antennas is in the second level, determines that the two base station antennas are a pair of adjacent base station antennas whose antennas are farther apart from each other in terms of propagation space than the antennas in said pair of the close base station antennas are.

9. The method for determining base station antenna proximity state according to claim 7, wherein
said mobile terminal measures the strength of the received signal from said plurality of base station antennas while said terminal is not communicating with said plurality of base station antennas to transmit and receive a signal.

10. The method for determining base station antenna proximity state according to claim 7, wherein
said mobile terminal measures the strength of the received signal from said plurality of base station antennas while it is holding communication to transmit and receive a signal resulting from user's communication.

11. The method for determining base station antenna proximity state according to claim 7, wherein
said mobile terminal autonomously measures the strength of the received signal from said plurality of base station antennas.

12. The method for determining base station antenna proximity state according to claim 7, wherein
said mobile terminal measures the strength of the received signal from said plurality of base station antennas while said terminal is communicating with said plurality of base station antennas to transmit and receive a signal.

* * * * *